United States Patent
Fleming

(10) Patent No.: US 6,681,489 B1
(45) Date of Patent: Jan. 27, 2004

(54) METHOD FOR MANUFACTURING A VEHICLE FRAME ASSEMBLY

(76) Inventor: Sean M. Fleming, 621 Spreading Spring Rd., Buchanan, VA (US) 24066

( * ) Notice: Subject to any disclaimer, the term of this patent is extended or adjusted under 35 U.S.C. 154(b) by 0 days.

(21) Appl. No.: 10/355,313

(22) Filed: Jan. 31, 2003

(51) Int. Cl.[7] .......................... B21D 53/88; B62D 21/12
(52) U.S. Cl. ..................... 29/897.2; 29/417; 280/785
(58) Field of Search .................. 29/897.2, 897.35, 29/897, 412–418; 280/785; 72/247

(56) References Cited

U.S. PATENT DOCUMENTS

| | | | | |
|---|---|---|---|---|
| 1,593,783 A | * | 7/1926 | Stresau | 280/796 |
| 1,911,061 A | * | 5/1933 | Clark | 280/785 |
| 2,127,618 A | * | 8/1938 | Riemenschnieder | 29/417 |
| 3,704,507 A | * | 12/1972 | Grube | 29/417 |
| 3,850,763 A | * | 11/1974 | Zinnbauer et al. | 205/206 |
| 4,006,617 A | | 2/1977 | Foster | 72/10.1 |
| 4,386,792 A | * | 6/1983 | Moore et al. | 280/785 |
| 5,005,864 A | * | 4/1991 | Chachere | 280/785 |
| 5,031,435 A | | 7/1991 | Seto et al. | 72/247 |
| 5,154,074 A | * | 10/1992 | Haraguchi et al. | 72/247 |
| 5,732,582 A | * | 3/1998 | Knudson | 72/131 |
| 5,855,394 A | | 1/1999 | Horton et al. | 280/781 |
| 6,189,930 B1 | | 2/2001 | Kalazny | 280/781 |
| 6,240,820 B1 | | 6/2001 | Sturrus et al. | 83/188 |
| 6,345,425 B1 | | 2/2002 | Rosasco et al. | 29/33 D |
| 6,360,441 B1 | | 3/2002 | Himsl et al. | 29/897.2 |
| 6,416,136 B1 | * | 7/2002 | Smith | 301/128 |
| 6,488,791 B1 | | 12/2002 | Powers, II | 148/647 |

* cited by examiner

Primary Examiner—Gregory Vidovich
Assistant Examiner—Marc Jimenez
(74) Attorney, Agent, or Firm—Andrus, Sceales, Starke & Sawall

(57) ABSTRACT

A vehicle frame assembly including a pair of side bars, interconnecting crossbars and connecting brackets, all formed from channel sections, is manufactured using a flexible roll former that eliminates the need to use hard tooling. The shorter frame assembly components, including the crossbars and brackets, are formed as multi-piece gang members. The components are hole-punched with numerically controlled piercing equipment, resulting in accurate hole alignment for assembly. For components not requiring offsetting, the component sidebars and bracket and crossbar gang members are preferably heat treated before hole-punching.

13 Claims, 4 Drawing Sheets

METHOD FOR MANUFACTURING A VEHICLE FRAME ASSEMBLY

BACKGROUND OF THE INVENTION

The present invention pertains to the manufacture of the components for a vehicle frame assembly and, more particularly, to the continuous roll forming of frame sidebars, crossbar members, and bracket members, all comprising channel sections.

The present invention relates to use of a computer controlled roll former and an associated computer controlled hole punching apparatus to form the sidebar components, ganged bracket members, and ganged crossbar members, with the ganged members cut to form individual brackets and crossbars after all the preliminary forming is completed.

A typical frame member for a vehicle chassis includes a pair of parallel sidebars or side rails connected by transverse crossbars with the connections effected by brackets if the connections are made by bolting or riveting. Welded frames may not require connecting brackets. However, in the truck industry, bolted connections are preferred and predominate.

For many years, truck fame components were formed primarily by stamping individual pieces utilizing hard tooling designed to form sequentially identical component parts. Truck frame components are typically made of channel members, but within a particular frame assembly, both the size and the gauge of the channels for the respective sidebars, crossbars and brackets may vary. Thus, three or more sets of hard tooling may be required for stamping the components of a typical frame assembly. For a bolted (or riveted) frame assembly, the bolt holes are punched in the individual components after the components are stamped and often prior to final heat treating. Because the bolt holes may be punched with different punching apparatus, there is often a problem of bolt hole match-up at assembly. In addition, heat treating the components after the holes have been punched may result in further changes in bolt hole position and/or size.

All of the foregoing problems may be compounded where the components are supplied by more than one manufacturer or are made at different locations. In addition, truck manufacturers often desire essentially identical frame members in an order to be provided with varying bolt hole patterns depending on the engine, truck body and other intended uses for a particular frame. This also propounds the problems of bolt hole position and match-up.

SUMMARY OF THE INVENTION

In accordance with the present invention, a vehicle frame assembly, comprising sidebars, crossbars and connecting brackets, is manufactured using a computer controlled flexible roll former that eliminates the need for hard tooling. The shorter frame assembly components, namely the crossbars and the brackets, are formed as multi-piece gang members that are hole-punched and, if necessary, offset-formed before being cut into respective individual crossbars and brackets.

In one embodiment of the method of the present invention, the method comprises the steps of (1) forming a steel strip in the roll former to a first channel shape, (2) cutting the first channel shape to provide a sidebar, (3) adjusting the roll former and forming a steel strip to a second channel shape, (4) cutting the second channel shape to provide a multi-bracket gang member, (5) adjusting the roll former and forming a steel strip to a third channel shape, (6) cutting the third channel shape to provide a multi-crossbar gang member, (7) punching a plurality of attachment holes in the sidebars, in the bracket gang member, and in the crossbar gang member, and (8) cutting the bracket gang member and the crossbar gang member to provide respective individual brackets and crossbars.

In one variation of the foregoing method, each of the forming steps is performed on the same strip. The method may also include the step of heat treating the sidebars, the bracket gang member, and the crossbar gang member before punching. Preferably, the method comprises cutting the first channel shape to provide a plurality of pairs of sidebars, cutting the second channel shape to provide a plurality of bracket gang members, and cutting the third channel shape to provide a plurality of crossbar gang members.

In a variant method of the present invention, vehicle frame assemblies each including a pair of sidebars, a plurality of crossbars for interconnecting the sidebar pair, and a plurality of connection brackets, all formed of channel sections, are manufactured by a method comprising the steps of (1) forming sidebars, ganged bracket members, and ganged crossbar members utilizing an adjustable computer controlled roll former, (2) heat treating, if necessary, the sidebars, bracket members and crossbar members, (3) punching connection holes in the sidebars, bracket members and crossbar members utilizing a computer controlled punch, and (4) cutting the bracket members and crossbar members to form individual brackets and crossbars.

This variant method may also include the step of, prior to cutting the crossbar members, forming offset portions at selected positions of the crossbar members. The offset portions are preferably formed at crossbar end positions defined by the subsequent cutting step. The offset forming step may comprise vertical offsetting or horizontal offsetting.

A further embodiment of the method of the present invention comprises manufacturing a plurality of vehicle frame assemblies, each including a pair of sidebars, a plurality of crossbars and a plurality of brackets, including the steps of (1) forming the sidebars to individual cut lengths, (2) forming the crossbars and the brackets, respectively, in initial ganged crossbar members and ganged bracket members, (3) punching the side bars, crossbar members, and bracket members in a computer controlled punch device to form connection holes, and (4) cutting the crossbar members and the bracket members to form individual crossbars and brackets.

Preferably, the forming step of the foregoing method comprises roll forming. The roll forming step preferably utilizes a computer-controlled adjustable roll former. The method may also include the step of heat treating the sidebars, crossbar members and bracket members prior to punching. The heat treating step is preferably performed after the roll forming step.

DETAILED DESCRIPTION OF THE PREFERRED EMBODIMENTS

In a roll former, structural shapes may be formed from rolls of flat strip steel or other metals by moving the strip through progressive tooling to change the shape of the strip to, for example, a channel shape. Channel members so formed may be continuously produced and cut to length with a flying shear, all in a manner known in the art. In accordance with the method of the present invention, to be described in detail hereinafter, an automated flexible roll forming system, of the type made, for example, by Stam Spa (Italy) is used to form three different channel member components for a vehicle frame assembly and is combined with a computer controlled punch or piercing apparatus, and optimally other offsetting devices, to form the frame components in an extremely accurate and cost effective way.

Figure 1:
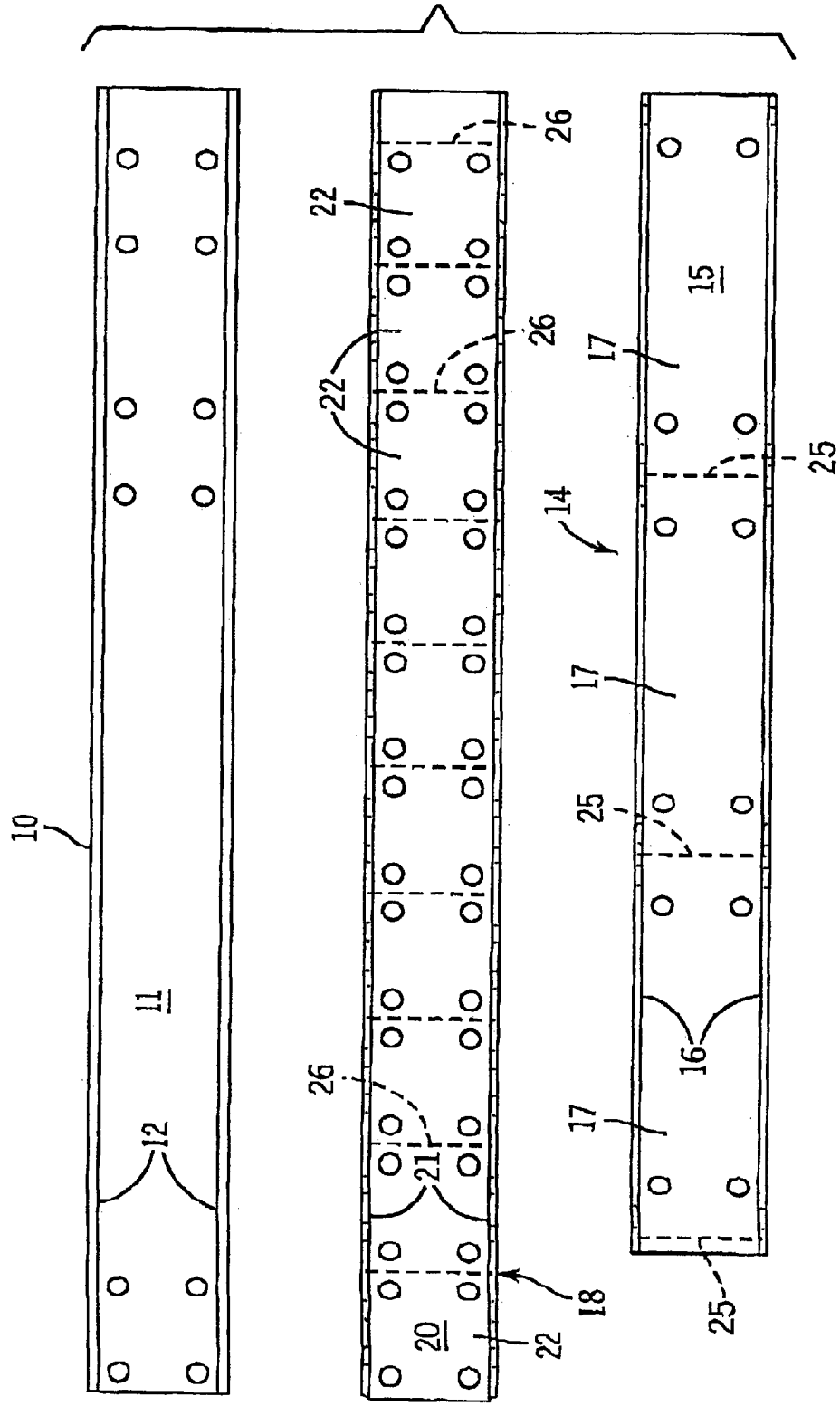
FIG. 1 is a side elevation view of a vehicle frame sidebar, bracket gang member, and crossbar gang member formed in accordance with the method of the present invention.

FIG. 1 shows the three master components of a vehicle frame assembly after they have been initially roll formed, heat treated if necessary, and pierced to form the holes for bolts or rivets used to assemble the frame. Each of the elements shown in FIG. 1 comprises a channel member. One component comprises a sidebar 10 of a conventional channel section, including a central web 11 and opposite end flanges 12. To produce a complete frame 13, as shown in part in FIG. 2, two sidebars 10 are required. The sidebars are individually cut to length as they exit the roll former, preferably utilizing a flying shear as indicated above. The lower component in FIG. 1 is a crossbar gang member 14 which is formed similarly to the sidebar 10 but may have different dimensions for its web 15 and flanges 16, and may be formed from a different gauge steel strip. The crossbar gang member 14 is formed to any convenient length in the roll former, resulting in multiple crossbars 17 subsequently provided in a cutting operation which will be described below. Although a crossbar gang member 14 having three potential crossbars 17 is shown in FIG. 1, a roll former may be capable of producing a member having a length, for example, of about 40 feet from which up to 16 crossbars 17 may be subsequently cut.

The middle member in FIG. 1 comprises a bracket gang member 18 which, like the side bar 10 and crossbar gang member 14, is roll formed to a channel section including a web 20 and flanges 21. The bracket gang member 18 may be heat treated after forming, if necessary, hole punched in a computer controlled piercing apparatus and subsequently cut to short lengths to form connecting brackets 22 utilized to attach the crossbars 17 to the sidebars 10 in the assembly of the frame 13.

Figure 3:
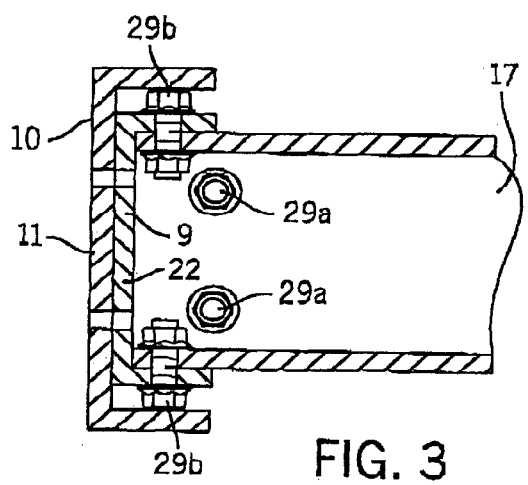
FIG. 3 is an enlarged sectional detail taken on line 3—3 of FIG. 2.
Figure 4:
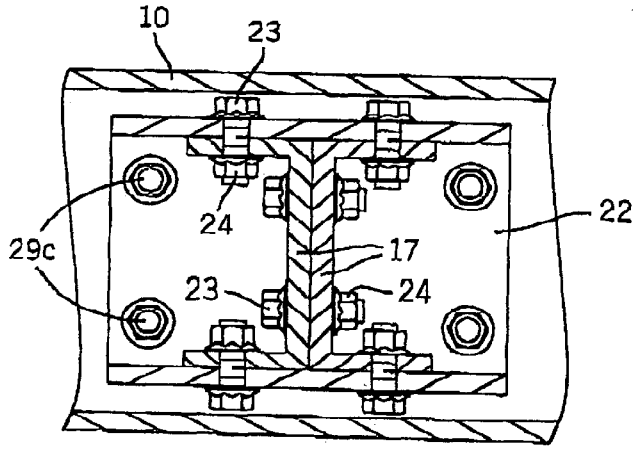
FIG. 4 is an enlarged sectional detail taken on line 4—4 of FIG. 2.

FIGS. 3 and 4 show how flange head bolts 23 and related flange head nuts 24 are used to connect the crossbars 17 to the sidebars 10, utilizing brackets 22. Specifically, the frame 13 is assembled with the following bolted connections, as shown in FIGS. 3 and 4. A pair of crossbars 17 is bolted back-to-back with bolted connections 29a. This crossbar subassembly is connected to a bracket 22 by bolted connections 29b interconnecting the crossbar flanges 16 to the bracket flanges 21. Finally, the brackets are bolted to the sidebars 10 with bolted connections 29c attaching their respective webs 20 and 11. In these figures, it will be noted that the web 11 of the sidebar 10 has the greatest width, the web 14 of the crossbar 17 has the smallest width, and the web 20 of the bracket 18 has an intermediate width. Other frame assemblies may use channel components with web (and flange) dimensions that are relatively different.

It is important to note, however, that regardless of variations in the sizes of the webs, the heights of the flanges, or the gauge of the material strip from which the channel pieces are formed, each of the profiles for the sidebars 10, crossbar gang members 14, and bracket gang members 18 can be programmed into the computer controlled roll former to automatically provide the desired shape and size. No custom hard tooling is required and, consequently, once programmed, there is no tooling changeover required when going from one shape to another. Instead, the computer controlled roll former permits on-the-fly change from one roll-formed shape to the next, thereby permitting the continuous manufacturer of an order of any desired size of sidebars 10, crossbar gang members 14 and bracket gang members 18.

The roll forming process may utilize ultra high strength low alloy steel (UHSLA), such as that having a yield strength in excess of 100 ksi. Preferably, however, lower yield strength steel, in the range of 30–50 ksi, is used. After various channel members 10, 14 and 18 are formed, they are heat treated to raise the yield to, for example, in excess of 100 ksi, using a conventional heat treating process, including austinitizing and quenching. One such heat treating process is described in U.S. Pat. No. 6,488,791. After heat treat, the component pieces 10, 14 and 18 are punched to form connecting bolt holes in a computer controlled piercing apparatus of the mechanical type made, for example, by Beatty Machine Co. (US) or the hydraulic type made, for example, by Soenen (Belgium). The piercing or punching operation provides accurate control of the hole locations and permits ready changes in bolt hole locations for special customized order criteria. Forming the bolt holes after heat treat avoids the possibility of bolt hole location or size deviations as the result of growth in heat treating. Bolt hole accuracy and alignment, and ease of fit-up, are all enhanced as a result of this process.

Figure 2:
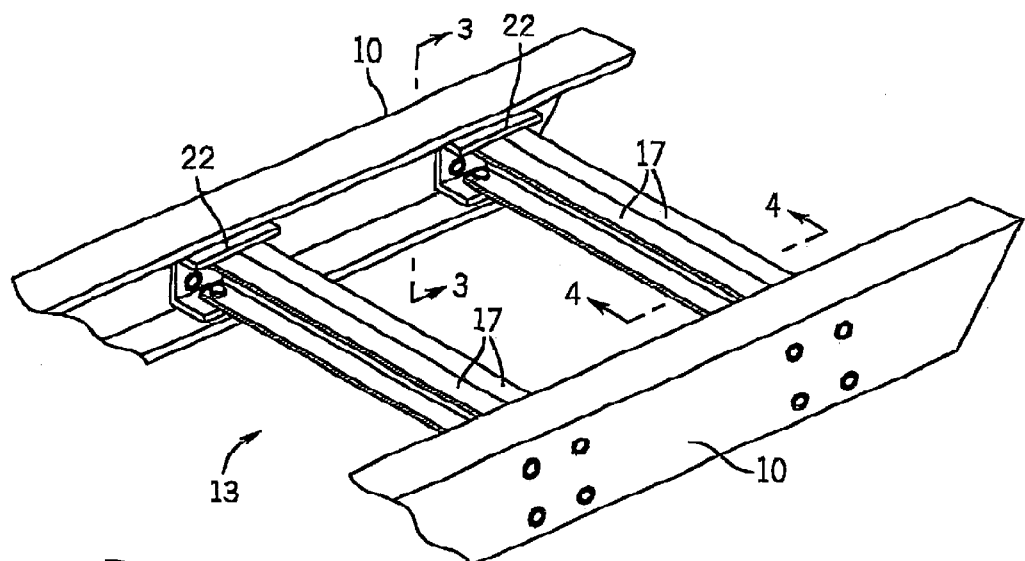
FIG. 2 is a perspective view of a portion of a vehicle frame assembled with the components formed in accordance with the present invention.

Referring again to FIG. 1, after the bolt holes have been formed, both the crossbar gang members 14 and the bracket gang members 18 are cut on the respective cut lines 25 and 26 form the final crossbars 17 and brackets 22. Cutting may be provided by conventional sawing devices, by plasma or laser cutting, or some other method. The component pieces 10, 17 and 22 are ready for assembly using the bolted connectors 23 and 24 as shown in FIGS. 2–4.

Figure 5:
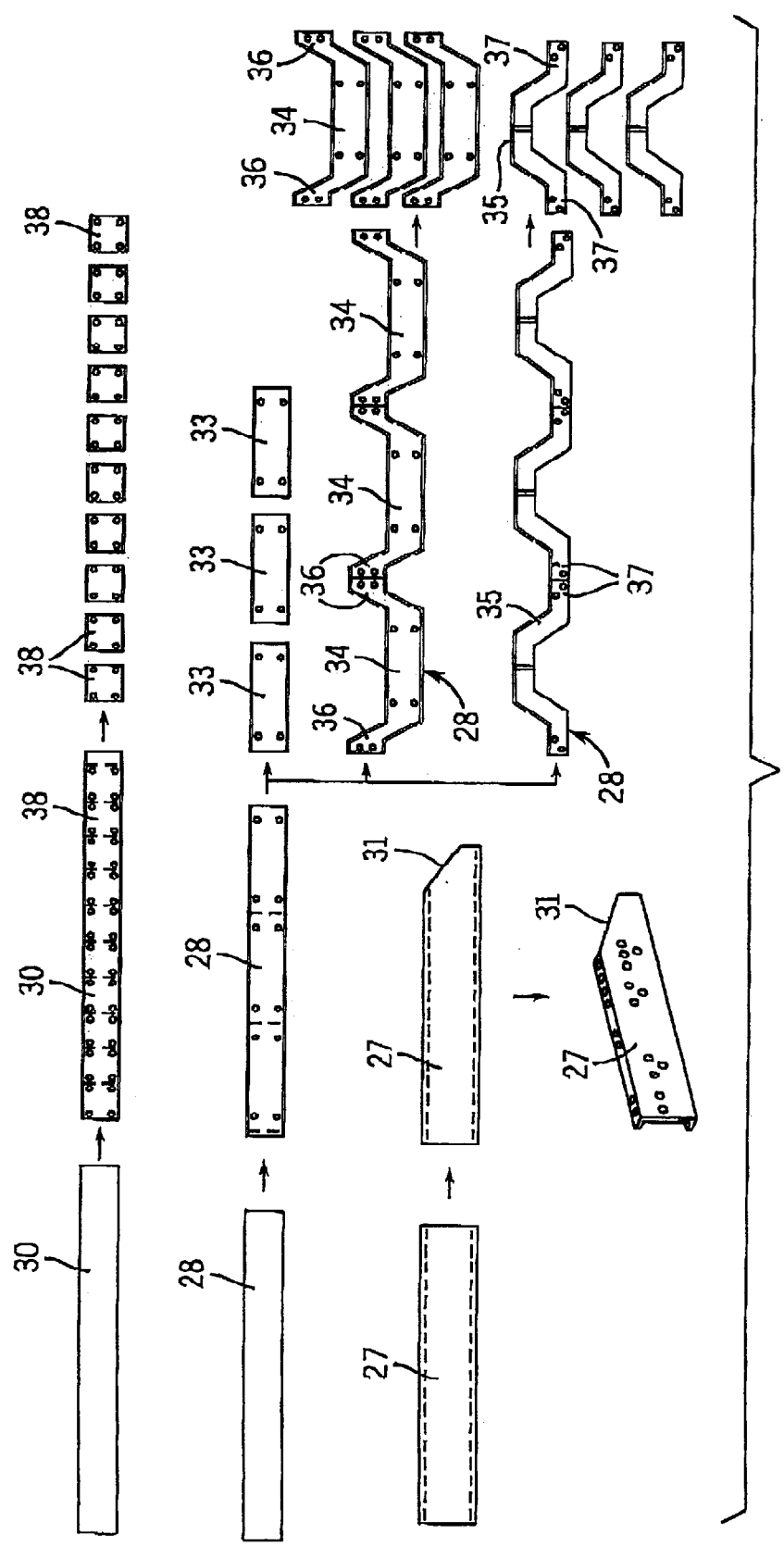
FIG. 5 is a schematic process flow diagram for the manufacture of a frame assembly in accordance with the present invention.
Figure 6:
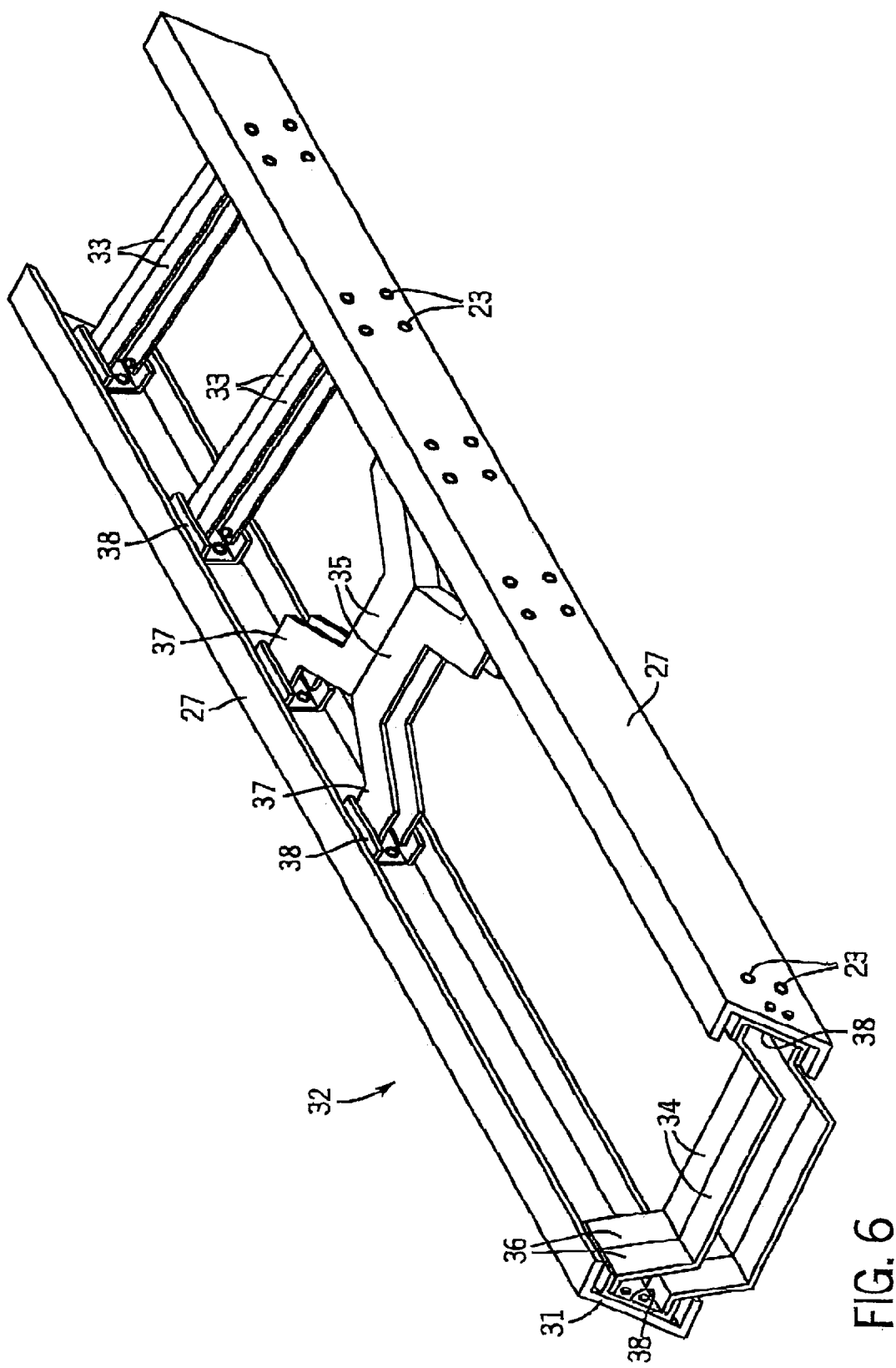
FIG. 6 is a perspective view of a frame assembled with the components made in accordance with the process of FIG. 5.

Referring now to FIG. 5, there is shown a process flow for a somewhat more complex frame manufacturing process and, in FIG. 6, there is shown a truck frame assembled from the components of the FIG. 5 process. The computer controlled roll former is set and operated to roll form the sidebars 27, the crossbar gang members 28 and the bracket gang members 30 all in a manner similar to that described above. If desired, each of the members 27, 28 and 30 may be heat treated. The front edge of the sidebars 27 may be trimmed, as with a trim cut 31, depending on the truck manufacturer's requirements. The bolt holes are then punched in the web of the sidebars 27, leaving them ready for assembly into the frame 32 shown in FIG. 6. With reference to FIG. 6, the frame 32 includes three different types of crossbars, namely, straight crossbars 33, vertically offset crossbars 34 and horizontally offset crossbars 35. Such various crossbars may be required to meet a truck manufacturer's particular requirements for strength, engine position, and other requirements. The vertically offset ends 36 in crossbars 34 and the horizontally offset ends 37 in crossbars 35 are formed in the ganged configuration of member 28. This offsetting process may be performed without the use of special hard tooling and dies in a computer controlled forming apparatus, such as a hydraulic offsetting press made, for example, by Stenhoj A/S (Denmark). The offsetting steps may also be performed after the connecting holes have been punched in the crossbars without loss of accuracy in bolt hole position.

The assembled truck frame 32, shown in FIG. 6, includes a pair of sidebars 27 each having a trim cut 31 on the front edge, immediately to the rear of which are attached a pair of vertically offset crossbars 34. The crossbars 34 are attached at their offset ends 36 to the side bars 27 by the use of brackets 38 cut from the bracket gang members 30 in the same manner previously described. Near the center of the frame 32, a pair of back-to-back horizontally offset crossbars 35 are attached by their offset ends 37 to the sidebars 27, using brackets 38. Finally, at the rear of the frame, two longitudinally spaced pairs of straight crossbars 33 are attached at their opposite ends between the sidebars 27, again utilizing connecting brackets 38. All of the foregoing connections are preferably effected with the same type of bolt and nut assemblies 23, 24 described above. Riveted connections may also be used.

The roll forming apparatus described herein can form various size channel members from steel strip to provide sidebars, crossbar gang members and bracket gang members with web widths in a range of about 5 inches to 13 inches, and with flange heights in the range of about 2 inches to 4½ inches. Steel strip with gauges varying from 3/16 inch to 7/16 inch may be processed. The aforementioned dimensional ranges are typical, although if the application requires may extend beyond these ranges. The soft tooling used in the computer controlled roll former permits on-the-fly changes from one channel size to another and, if a gauge change is required for a channel size change, the strip roll change may be effected simply and in a short time. The customer does not have to purchase custom hard tooling nor is there the customary hard tooling change over required when changing channel sizes as would be required in a conventional stamping operating. The entire process is extremely flexible, accurate, fast and cost-effective.

I claim:

1. A method for manufacturing a vehicle frame assembly utilizing an adjustable computer controlled roll former and an associated computer controlled hole punch device, said method comprising the steps of:

(1) forming in the roll former a steel strip to a first channel shape;
   (2) cutting the first channel shape to provide a pair of sidebars;
   (3) adjusting the roll former and forming a steel strip to a second channel shape;
   (4) cutting the second channel shape to provide a bracket gang member;
   (5) adjusting the roller former and forming a steel strip to a third channel shape;
   (6) cutting the third channel shape to provide a crossbar gang member;
   (7) punching with the punch device a plurality of attachment holes in the sidebars, in the bracket gang member, and in the crossbar gang member; and,
   (8) cutting the bracket gang member and the crossbar gang member to provide respective individual brackets and crossbars.

2. The method as set forth in claim 1 wherein each of the forming steps is performed on the same strip.

3. The method as set forth in claim 1 including the step of heat treating the sidebars, the bracket gang member, and the crossbar gang member before punching.

4. A method for manufacturing a plurality of vehicle frame assemblies each including a pair of sidebars, a plurality of crossbars for interconnecting the sidebar pair, and a plurality of connection brackets, and wherein said sidebars, crossbars and brackets are all formed of channel sections, said method comprising the steps of:

(1) utilizing an adjustable computer controlled roll former, forming sidebars, ganged bracket members, and ganged crossbar members;
   (2) heat treating, if necessary, the sidebars, bracket members and crossbar members;
   (3) utilizing a computer controlled punch, punching connection holes in said sidebars, bracket members and crossbar members; and,
   (4) cutting the bracket members and crossbar members to form individual brackets and crossbars.

5. The method as set forth in claim 4 including the step of, prior to cutting the crossbar members, forming offset portions at selected positions of the crossbar members.

6. The method as set forth in claim 5 wherein said offset portions are formed at crossbar end positions defined by the cutting step.

7. The method as set forth in claim 6 wherein said step of forming offset portions comprises vertical offsetting.

8. The method as set forth in claim 6 wherein said step of forming offset portions comprises horizontal offsetting.

9. A method for manufacturing a plurality of vehicle frame assemblies, each including a pair of sidebars, a plurality of crossbars and a plurality of brackets, said method comprising the steps of:

(1) forming the sidebars to individual cut lengths;
   (2) forming the crossbars and brackets, respectively, in initial ganged crossbar members and ganged bracket members;
   (3) punching the sidebars, crossbar members and bracket members in a computer controlled punch device to form connection holes; and,
   (4) cutting the crossbar members and the bracket members to form individual crossbars and brackets.

10. The method as set forth in claim 9 wherein the forming step comprises roll forming.

11. The method as set forth in claim 10 wherein the roll forming step comprises utilizing a computer-controlled adjustable roll former.

12. The method as set forth in claim 9 including the step of heat treating, the sidebars, crossbar members and bracket members prior to punching.

13. The method as set forth in claim 12 wherein the heat treating step is performed after the forming step.

* * * * *

UNITED STATES PATENT AND TRADEMARK OFFICE
CERTIFICATE OF CORRECTION

PATENT NO.   : 6,681,489 B1
DATED        : January 27, 2004
INVENTOR(S)  : Sean M. Fleming It is certified that error appears in the above-identified patent and that said Letters Patent is hereby corrected as shown below:

<u>Title page,</u>
Item [73], Assignee, add -- [73] Assignee: Metalsa Roanoke Inc. Roanoke, Virginia, U.S.A. --

Signed and Sealed this

Thirteenth Day of April, 2004

JON W. DUDAS
*Acting Director of the United States Patent and Trademark Office*